(12) United States Patent
Kim et al.

(10) Patent No.: US 8,271,654 B2
(45) Date of Patent: Sep. 18, 2012

(54) METHOD AND APPARATUS FOR PROVIDING APPLICATION BY USING APPLICATION INFORMATION TABLE

(75) Inventors: Kwang-hyuk Kim, Suwon-si (KR); Keum-yong Oh, Yongin-si (KR); Sung-jin Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 509 days.

(21) Appl. No.: 12/604,774

(22) Filed: Oct. 23, 2009

(65) Prior Publication Data

US 2010/0107181 A1 Apr. 29, 2010

(30) Foreign Application Priority Data

Oct. 23, 2008 (KR) ........................ 10-2008-0104262

(51) Int. Cl.
*G06F 15/173* (2006.01)
*H04N 7/173* (2011.01)
*H04N 7/16* (2011.01)
*H04N 9/80* (2006.01)

(52) U.S. Cl. ........ 709/226; 709/225; 725/116; 725/152; 386/248

(58) Field of Classification Search ................. None
See application file for complete search history.

(56) References Cited

U.S. PATENT DOCUMENTS

| 7,216,170 | B2 * | 5/2007 | Ludvig et al. ............ 709/225 |
| 7,590,331 | B2 * | 9/2009 | Horii et al. ............ 386/248 |
| 8,037,317 | B2 * | 10/2011 | Kusudo et al. ............ 713/187 |
| 2003/0217369 | A1 * | 11/2003 | Heredia ............ 725/152 |
| 2005/0257059 | A1 * | 11/2005 | Schaefer et al. ............ 713/176 |
| 2009/0144793 | A1 * | 6/2009 | Lin ............ 725/116 |

* cited by examiner

*Primary Examiner* — Wen-Tai Lin
(74) *Attorney, Agent, or Firm* — Sughrue Mion, PLLC (57) ABSTRACT

Disclosed are a method and apparatus for providing an application. The method includes receiving a first-level application information table (AIT) including one or more application driving conditions and location information of one or more AITs; creating an AIT map table by using the first-level AIT; obtaining a second-level AIT corresponding to a predetermined application driving condition included in the AIT map table based on the location information of the second-level AIT; driving an application based on the second-level AIT.

20 Claims, 7 Drawing Sheets

METHOD AND APPARATUS FOR PROVIDING APPLICATION BY USING APPLICATION INFORMATION TABLE

CROSS-REFERENCE TO RELATED PATENT APPLICATION

This application claims the benefit of Korean Patent Application No. 10-2008-0104262, filed on Oct. 23, 2008, in the Korean Intellectual Property Office, the disclosure of which is incorporated herein in its entirety by reference.

BACKGROUND OF THE INVENTION

1. Field of the Invention

Methods and apparatuses consistent with the present invention relate to providing an application to a digital content reproduction device by using an application information table (AIT) received from a data broadcasting stream.

2. Description of the Related Art

As digital broadcasting has developed, data broadcasting for transmitting additional information related to video data, and applications enabling interaction with viewers, has been introduced. The data broadcasting can provide various types of information related to broadcasting programs, daily living, an Internet access service, an electronic commerce service, a bidirectional entertainment service, etc. by using terrestrial, satellite, or cable broadcasting networks. Currently, international data broadcasting standards include the OpenCable Application Platform (OCAP), the Advanced Common Application Platform (ACAP), and the Multimedia Home Platform (MHP).

Due to the development of broadcasting standards such as the OCAP, various types of receivers for various standards are available, various applications for the various receivers are continuously produced, and these applications are transmitted through data broadcasting streams. An addressable application information table (AIT) technology has been introduced in order to provide an appropriate application for each receiver.

Figure 1:
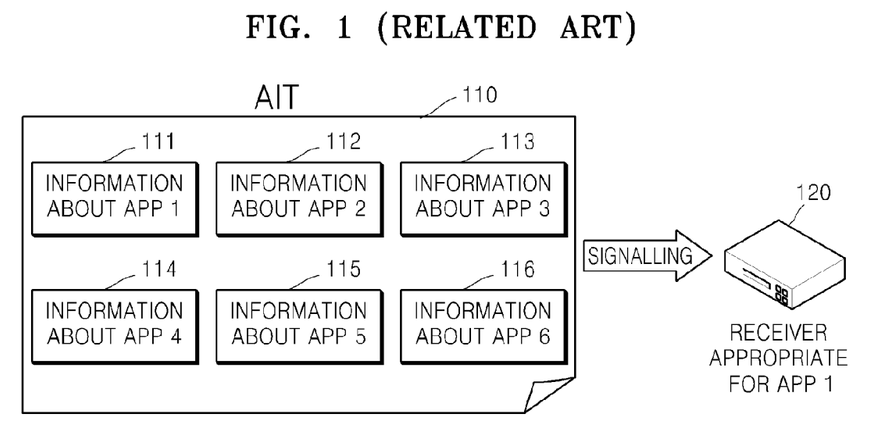
FIG. 1 is a diagram for describing a conventional addressable application information table (AIT) technology.

FIG. 1 is a diagram for describing a conventional addressable AIT technology.

Referring to FIG. 1, the addressable AIT technology is a mechanism in which pieces of information 111 through 116 about applications 1 through 6 are included in AIT information 110 in consideration of different receivers, the AIT information 110 is sent to a receiver 120, and the receiver 120 selects and drives an application that is appropriate for the receiver 120.

Thus, although the receiver 120 corresponds to the information 111 about the application 1 as in FIG. 1, the AIT information 110 including not only the information 111 about the application 1 but also the other pieces of information 112 through 116 about the applications 2 through 6, are provided to the receiver 120.

As such, a receiver 120 appropriate for the application 1 also has to receive and store the entire AIT information 110 in memory and then to search the desired information about application 1 from among the pieces of information 111 through 116 in a loop function.

SUMMARY OF THE INVENTION

Exemplary embodiments of the present invention provide a method and apparatus for optimally providing an application to a receiver by minimizing access to unnecessary information of an application information table (AIT) and easily obtaining the most appropriate information for the receiver.

According to an aspect of the present invention, there is provided a method of providing an application from a data broadcasting stream to a digital content reproduction device, the method including receiving a first-level application information table (AIT) including one or more application driving conditions and location information of one or more AITs; creating an AIT map table by using the first-level AIT; obtaining a second-level AIT corresponding to a predetermined application driving condition included in the AIT map table based on the location information of the second-level AIT; and driving an application based on the second-level AIT.

However, according to the function of a receiver, the creating of the AIT map table may not be performed and the location information of the second-level AIT may be extracted by only checking the AIT map table.

The application driving conditions may include device attribute information, user attribute information, or content reproduction time information.

Also, the second-level AIT may be selected by using version information of an application of an AIT as attribute information.

If the application driving conditions include the device attribute information or the user attribute information, the device attribute information or the user attribute information may include one or more pieces of main attribute information and one or more pieces of sub attribute information, and the first-level AIT and the second-level AIT may be hierarchically organized based on the main attribute information and the sub attribute information by including the main attribute information in the first-level AIT and including the sub attribute information in the second-level AIT.

The second-level AIT may include the location information of a third-level AIT corresponding to the sub attribute information, and the method may further include obtaining the third-level AIT based on the location information of the third-level AIT; and driving an application based on the third-level AIT.

The obtaining of the second-level AIT may include obtaining the second-level AIT corresponding to a desired application driving condition described by using an AND operator, OR operator, or NOT operator operations from among the application driving conditions included in the first-level AIT.

If the application driving conditions include the content reproduction time information, the method may further include calculating a current reproduction time of content that is being reproduced by a device; and selecting a media time corresponding to the current reproduction time from among one or more pieces of the content reproduction time information which is the application driving conditions, and the obtaining of the second-level AIT may include obtaining the second-level AIT based on the location information of the second-level AIT corresponding to the media time.

The first-level AIT and the second-level AIT may be hierarchically organized by including the content reproduction time information in the first-level AIT and including the device attribute information or the user attribute information in the second-level AIT.

The second-level AIT may include the location information of a fourth-level AIT corresponding to the device attribute information or the user attribute information, and the method may further include obtaining the fourth-level AIT based on the location information of the fourth-level AIT; and driving an application based on the fourth-level AIT.

Each of the first-level through fourth-level AITs may be created as metadata in the form of a markup language, or as a descriptor in the form of text or binary data.

The device attribute information may include information regarding a vendor or hardware (H/W) of a device, the user attribute information may include information regarding a preference or an age of a user of the device, and the content reproduction time information may include information regarding a media time or a start time of content.

According to another aspect of the present invention, there is provided an apparatus for providing an application from a data broadcasting stream to a digital content reproduction device, the apparatus including an application information table (AIT) reception unit for receiving a first-level AIT including one or more application driving conditions and location information of one or more AITs; an AIT map table creation unit for creating an AIT map table by using the first-level AIT; an AIT processing unit for obtaining a second-level AIT corresponding to a predetermined application driving condition included in the AIT map table based on the location information of the second-level AIT; and an application driving unit for driving an application based on the second-level AIT.

The application driving conditions may include device attribute information, user attribute information, or content reproduction time information.

If the application driving conditions include the device attribute information or the user attribute information, the device attribute information or the user attribute information may include one or more pieces of main attribute information and one or more pieces of sub attribute information, and the first-level AIT and the second-level AIT may be hierarchically organized based on the main attribute information and the sub attribute information by including the main attribute information in the first-level AIT and including the sub attribute information in the second-level AIT.

The second-level AIT may include the location information of a third-level AIT corresponding to the sub attribute information, the AIT processing unit may obtain the third-level AIT based on the location information of the third-level AIT, and the application driving unit may drive an application based on the third-level AIT.

If the application driving conditions include the content reproduction time information, the apparatus may further include a reproduction time calculation unit for calculating a current reproduction time of content that is being reproduced by a device, and the AIT processing unit may select a media time corresponding to the current reproduction time from among one or more pieces of the content reproduction time information which is the application driving conditions, and obtains the second-level AIT based on the location information of the second-level AIT corresponding to the media time.

The first-level AIT and the second-level AIT may be hierarchically organized by including the content reproduction time information in the first-level AIT and including the device attribute information or the user attribute information in the second-level AIT.

The second-level AIT may include the location information of a fourth-level AIT corresponding to the device attribute information or the user attribute information, the AIT processing unit may obtain the fourth-level AIT based on the location information of the fourth-level AIT, and the application driving unit may drive an application based on the fourth-level AIT.

Each of the first-level through fourth-level AITs may be created as metadata in the form of a markup language, or as a descriptor in the form of text or binary data.

The device attribute information may include information regarding a vendor or hardware (H/W) of a device, the user attribute information may include information regarding a preference or an age of a user of the device, and the content reproduction time information may include information regarding a media time or a start time of content.

The AIT processing unit may obtain the second-level AIT corresponding to a desired application driving condition described by using an AND operator, OR operator, or NOT operator operation from among the application driving conditions included in the first-level AIT.

The location information of the second-level AIT in the first-level AIT may be information about the location of the second-level AIT on a data broadcasting stream, based on location information of servers included in a network.

Also, the location information of the third-level AIT in the second-level AIT may be information about the location of the third-level AIT on a data broadcasting stream, based on location information of servers included in a network.

Furthermore, in consideration of a greater number of cases, multi-level AITs including a fourth-level AIT, a fifth-level AIT, etc. may exist.

According to another aspect of the present invention, there is provided a computer readable recording medium having recorded thereon a computer program for executing the above method.

BRIEF DESCRIPTION OF THE DRAWINGS

The above and other features and aspects of the present invention will become more apparent by describing in detail exemplary embodiments thereof with reference to the attached drawings in which.

Like reference numerals in the drawings denote like elements. Although the drawings illustrate exemplary embodiments of the present invention, the drawings are not drawn on a predetermined scale and some features may be exaggerated for clarity.

DETAILED DESCRIPTION OF THE INVENTION

The attached drawings for illustrating exemplary embodiments of the present invention are referred to in order to gain a sufficient understanding of the present invention, the merits thereof, and the objectives accomplished by the implementation of the present invention.

Hereinafter, the present invention will be described in detail by explaining embodiments of the invention with reference to the attached drawings.

Exemplary embodiments of the present invention suggest a method of providing an application by categorizing application information table (AIT) information, selecting AIT information related to an application appropriate for a media time desired by a receiver, and driving a desired application.

Figure 2:
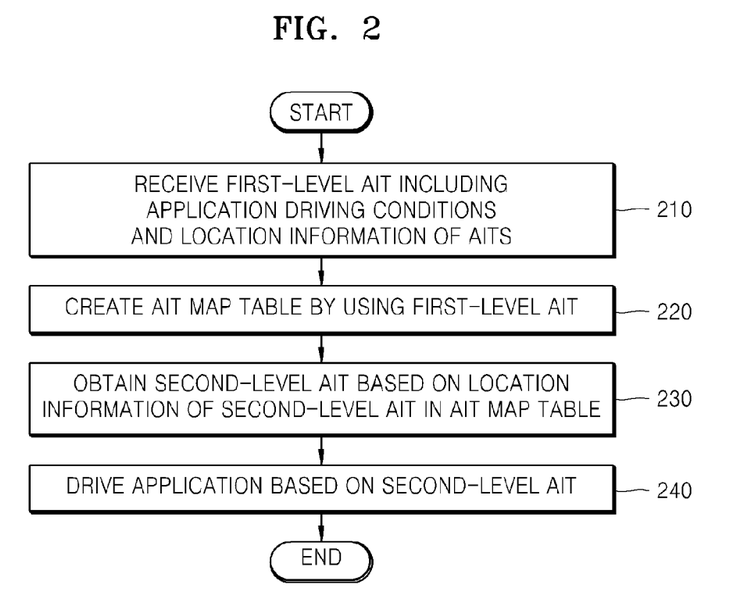
FIG. 2 is a flowchart of a method of providing an application, according to an exemplary embodiment of the present invention.

FIG. 2 is a flowchart of a method of providing an application, according to an exemplary embodiment of the present invention.

Referring to FIG. 2, the method according to the current exemplary embodiment of the present invention includes receiving a first-level AIT including one or more application driving conditions and location information of one or more AITs (operation 210); creating an AIT map table by using the first-level AIT (operation 220); obtaining a second-level AIT corresponding to a predetermined application driving condition included in the AIT map table based on the location information of the second-level AIT (operation 230); and driving an application based on the second-level AIT (operation 240).

In operation 210, the first-level AIT is received. The first-level AIT includes one or more application driving conditions and location information of one or more AITs such as the second-level AIT. In a hierarchical AIT to be described later, the first-level AIT that is initially received is referred to as an initial AIT. Since the hierarchical AIT diverges into a plurality of branches, the initial AIT is a root.

Since an application has to be driven in consideration of attributes of a device, an application driving condition may be device attribute information. In more detail, an application appropriate for a device for receiving a data broadcasting stream can be driven by obtaining an AIT based on the location information of the AIT, which is indicated by an attribute field of the initial AIT according to the attributes of the device.

The device attribute information may include an attribute value including information regarding a consumer electronics (CE) vendor who produces a receiver; information regarding whether a digital video recorder (DVR) or a home network is supported; information regarding whether an access restriction device such as a cable card or a conditional access system (CAS) is installed; information regarding whether a hard disk drive (HDD) is installed; information regarding a processing capability of a hardware (H/W) device with respect to graphic resolution, a H/W decoder, an acceleration function, etc.; or version information in consideration of each type of the above information.

Also, the device attribute information may include a combined attribute value relating to two or more types of the above information. In more detail, each attribute value may be a combined attribute value relating to multiple attributes instead of a single attribute and may be compared to other attribute values.

Alternatively, the application driving condition may be user attribute information such as the user's preference or age. Also, the application driving condition may be created by combining the device attribute information and the user attribute information.

Furthermore, the device attribute information or the user attribute information may indicate information for selecting the second-level AIT appropriate for the device by using the version information of the application or of the second-level AIT as a property.

In operation 220, the AIT map table including the application driving conditions and the location information of the AITs is created by using the first-level AIT. Thus, the device may find the location information of the second-level AIT appropriate for the device, from the AIT map table.

In operation 230, the second-level AIT corresponding to a desired application driving condition is obtained from the AIT map table with reference to the location information of the second-level AIT.

Alternatively, a receiver may obtain the second-level AIT corresponding to a desired application driving condition described by using an AND operator, OR operator, or NOT operator operations, from among the application driving conditions included in the first-level AIT.

Lastly, in operation 240, an application is driven as indicated by the second-level AIT. In this case, the application is a program for providing various additional services regarding various audio/video (A/V) media contents received from the data broadcasting stream, for example, an application program that is executed based on a Java virtual machine (JVM).

In the current embodiment, according to a function of a parser of the receiver, the location information of the second-level AIT may be extracted from the first-level AIT without creating the AIT map table, in operation 220.

As such, a content reproduction device may receive and drive a desired application without accessing unnecessary information.

An example of a hierarchical AIT used in the method illustrated in FIG. 2 will now be described with reference to FIG. 3.

Figure 3:
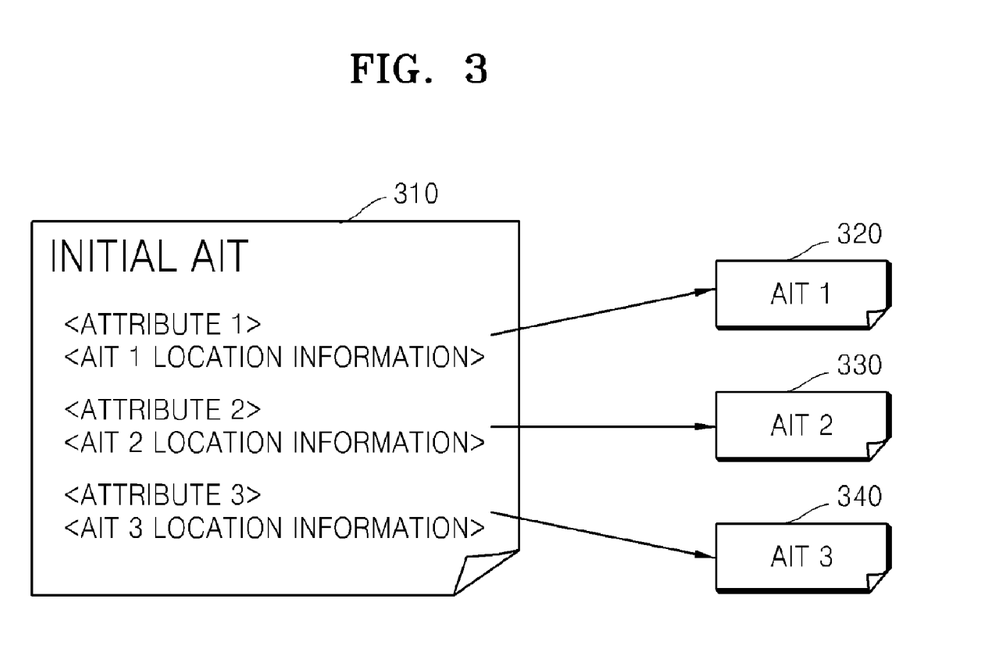
FIG. 3 is a structural diagram of a hierarchical AIT using device attribute information, according to an exemplary embodiment of the present invention.

FIG. 3 is a structural diagram of a hierarchical AIT using device attribute information, according to an embodiment of the present invention.

Referring to FIG. 3, an initial AIT 310 including location information for obtaining an AIT 1 320, an AIT 2 330, and an AIT 3 340 is provided.

Thus, a device appropriate for an attribute 1 obtains the AIT 1 320 based on the location information of the AIT 1 320 and then drives a corresponding application based on an application identifier (ID), an application control code, and an application descriptors loop which are included in the AIT 1 320. In this manner, devices appropriate for an attribute 2 and an attribute 3 respectively obtain the AIT 2 330 and the AIT 3 340 and drive corresponding applications.

Such an AIT may be created as metadata in the form of markup language, or as a descriptor in the form of text or binary data.

The AIT may be provided in the form of extensible markup language (XML) that is a representative markup language, as shown below.

```
<xs:element name="Properties">
    <xs:attribute name="dvr" version="1.3" >
        <xs:location="http://this_server/001/ait.xls" />
    </xs:atribute>
    <xs:attribute name="hn" version="1.0">
        <xs:location="http://this_server/002/ait.xls" />
    </xs:attribute>
    <xs:attribute name="cablecard" version="1.2">
        <xs:location="http://2nd_server/003/ait.xls" />
    </xs:attribute>
</xs:element>
```

Based on the AIT provided in the form of XML, if an attribute indicates a device type "DVR" and a version "1.3", a location of a corresponding AIT is "http://this_server/001/ait.xls". Likewise, if an attribute indicates a network type "hn (home network)" and a version "1.0", a location of a corresponding AIT is "http://this_server/002/ait.xls", and, if an attribute indicates a cable standard "cablecard" and a version "1.2", a location of a corresponding AIT is "http://2nd_server/003/ait.xls".

Alternatively, the AIT may be provided in the form of descriptor as shown below.

```
initial_AIT_descriptor( ) {
    descriptor_tag 8 uimsbf
    descriptor_length 8 uimsbf
    for(i=0; i<N; i++){
        device attribute_length 8 uimsbf
        for (i=0; i<N; i++) {
            device attribute_byte 8 uimsbf
        }
        ait_location_length 8 uimsbf
        for (i=0; i<N; i++) {
            ait_location_char 8 uimsbf
        }
    }
}
```

Such an AIT may diverge based on main attributes and then may provide location information of AITs based on new attributes, thereby creating a hierarchical AIT. An example of the hierarchical AIT will now be described with reference to FIG. 4.

Figure 4:
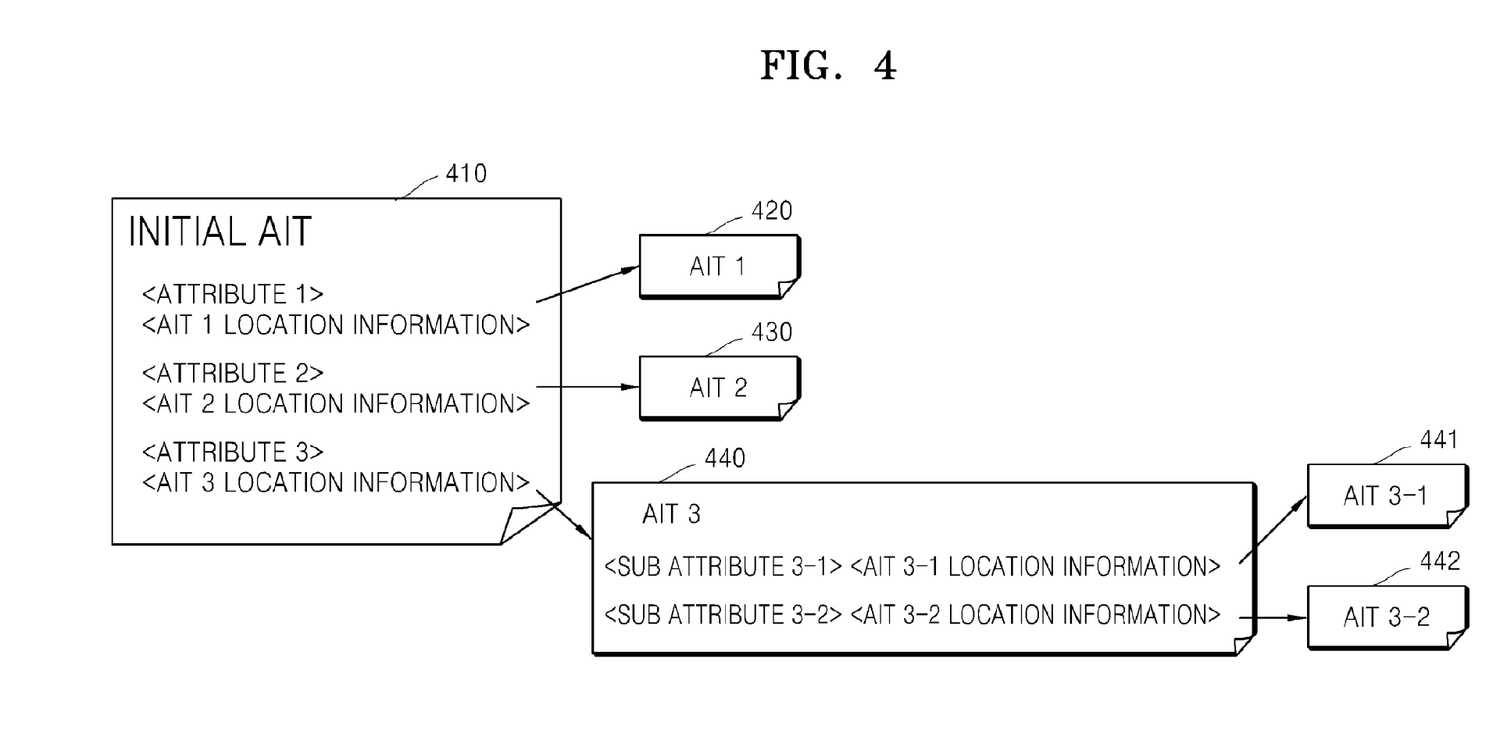
FIG. 4 is a structural diagram of a hierarchical AIT using main attribute information and sub attribute information, according to an exemplary embodiment of the present invention.

FIG. 4 is a structural diagram of a hierarchical AIT using main attribute information and sub attribute information, according to an embodiment of the present invention.

Referring to FIG. 4, an initial AIT 410 includes an attribute field for indicating device attribute information. In this case, the attribute field may indicate main attributes. Pieces of location information of an AIT 1 420, an AIT 2 430, and an AIT 3 440 respectively indicate the AIT 1 420, the AIT 2 430, and the AIT 3 440.

Meanwhile, each of the AIT 1 420, the AIT 2 430, and the AIT 3 440 may include a new attribute field. In this case, the attribute field included in each of the AIT 1 420, the AIT 2 430, and the AIT 3 440 may indicate sub attributes.

In more detail, as a representative example, the AIT 3 440 may include a sub attribute 3-1 and a sub attribute 3-2 and thus may correspondingly include location information of an AIT 3-1 441 and an AIT 3-2 442. Accordingly, the AIT 3-1 441 and the AIT 3-2 442 may be ultimately obtained based on the location information of the AIT 3-1 441 and the AIT 3-2 442.

For example, if an attribute 3 indicates a device type "DVR", a DVR device obtains the AIT 3 440. If the sub attribute 3-1 indicates a type of "MEMORY 128 MB" and the sub attribute 3-2 indicates a type of "MEMORY 256 MB", and if the DVR device has a memory of 128 MB, the DVR device is appropriate for the sub attribute 3-1 and thus may substantially obtain the AIT 3-1 441 with reference to the location information of the AIT 3-1 441.

As such, the device attribute information may include one or more pieces of main attribute information and one or more pieces of sub attribute information. The hierarchical AIT may be created by including the main attribute information in an initial AIT and including the sub attribute information in a second-level AIT.

Since the main attribute information and the sub attribute information may be recursively created, a device may effectively find an AIT exactly corresponding to its attributes and drive an application indicated by the AIT.

The location information of the AIT 1 420, the AIT 2 430, and the AIT 3 440 may be information about locations of the AIT 1 420, the AIT 2 430, and the AIT 3 440 on a data broadcasting stream, based on location information of servers included in a network.

Also, location information of sub-level AITs, which is provided by the AIT 1 420, the AIT 2 430, and the AIT 3 440 which are sub levels of the initial AIT 410, for example, the location information of the AIT 3-1 441 and the AIT 3-2 442 may be information about locations of the AIT 3-1 441 and the AIT 3-2 442 on a data broadcasting stream, based on location information of servers included in a network.

Furthermore, the present invention may also be applied to various multiple hierarchical AITs including a fourth-level AIT, a fifth-level AIT, or a lower-level AIT.

Figure 5:
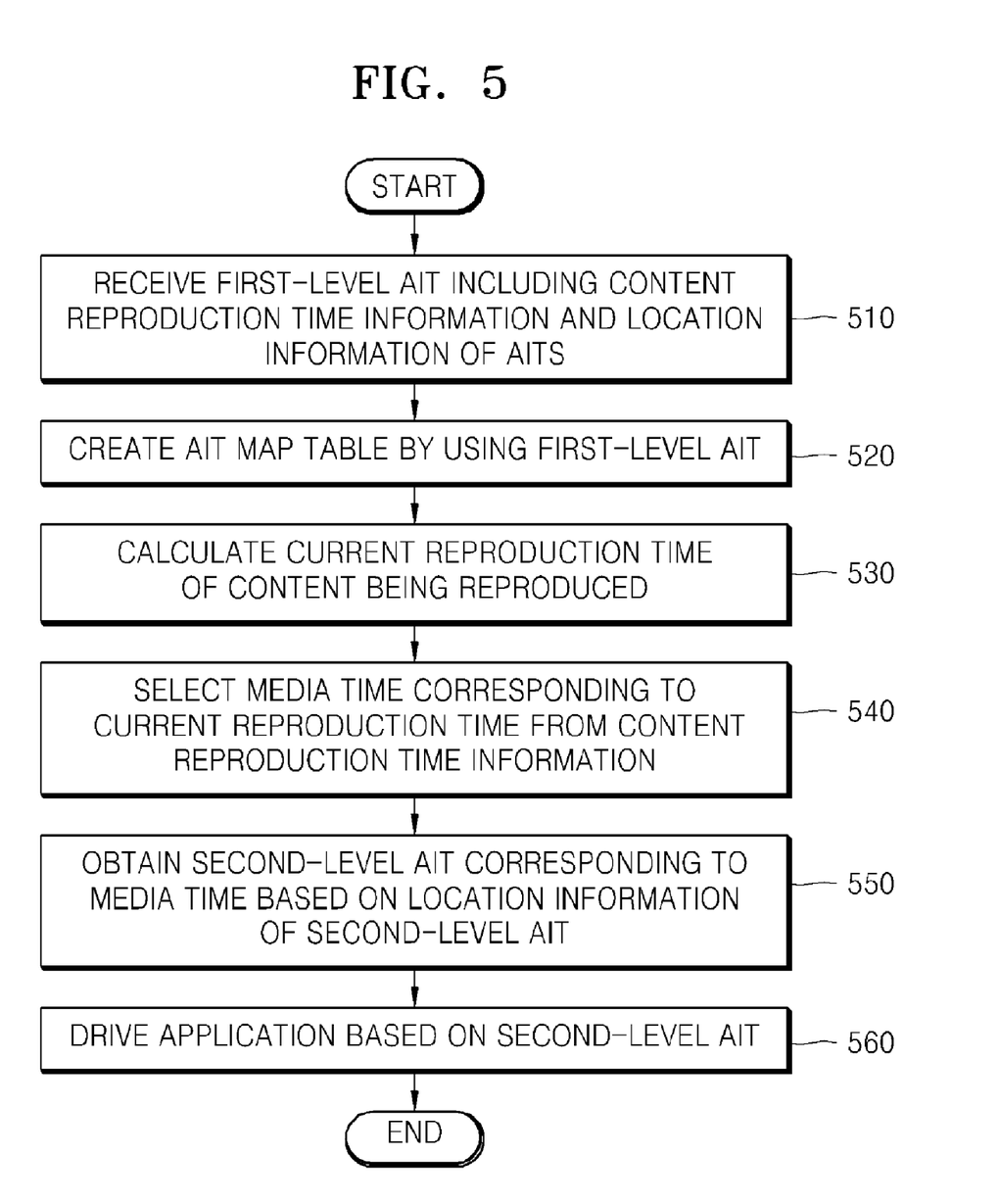
FIG. 5 is a flowchart of a method of providing an application based on a content reproduction time, according to an exemplary embodiment of the present invention.

FIG. 5 is a flowchart of a method of providing an application based on a content reproduction time, according to an embodiment of the present invention.

Referring to FIG. 5, the method according to the current exemplary embodiment of the present invention includes receiving a first-level AIT including one or more pieces of content reproduction time information and location information of one or more AITs (operation 510); creating an AIT map table by using the first-level AIT (operation 520); calculating a current reproduction time of content that is being reproduced by a device (operation 530); selecting a media time corresponding to the current reproduction time from among pieces of the content reproduction time information that are related to application driving conditions (operation 540); obtaining a second-level AIT corresponding to the media time based on the location information of the second-level AIT (operation 550); and driving an application based on the second-level AIT (operation 560).

The method illustrated in FIG. 5 will be described with reference to FIGS. 6 and 7 together.

Figure 6:
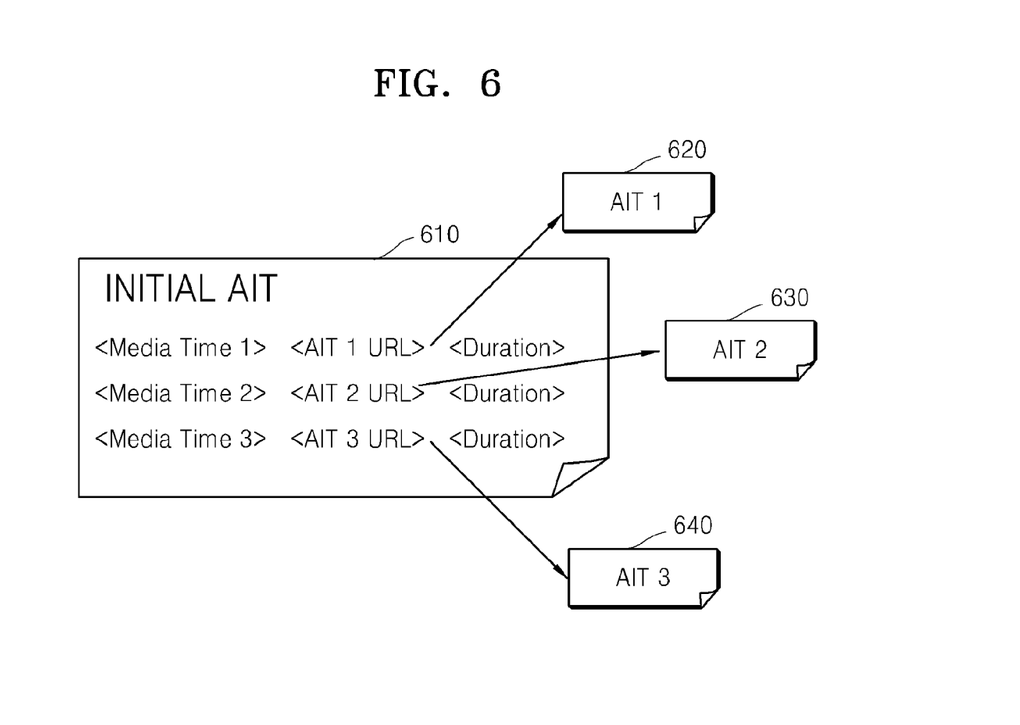
FIG. 6 is a structural diagram of a hierarchical AIT using content reproduction time information, according to an exemplary embodiment of the present invention.

FIG. 6 is a structural diagram of a hierarchical AIT using content reproduction time information, according to an embodiment of the present invention. FIG. 7 is a diagram showing durations of applications based on a content reproduction time 710, according to an exemplary embodiment of the present invention.

When video on demand (VOD) contents, network contents, or recorded contents are provided, the contents may have various reproduction times. The hierarchical AIT illustrated in FIG. 6, which includes an initial AIT 610, and an AIT 1 620, an AIT 2 630, and an AIT 3 640 to be separately applied to different media times, may be used to select an application to be driven at each of the various reproduction times.

A conventional method of transmitting an application through a data broadcasting stream uses a carousel method for recursively and periodically transmitting an application. Data transmission by using broadcasting waves is unidirectional and it cannot be checked whether a receiver successfully receives data. Thus, an error rate is reduced by recursively transmitting the same data. Unlike a local disk or a bidirectional network that can actively request necessary data, in the carousel method data having an error cannot be received until a transmission terminal retransmits the data and thus latency can be quite long. As such, the carousel method depends on a transmission cycle set by a manufacture and can have a problem of latency for receiving an application. However, the method illustrated in FIG. 5 provides uniform resource locator (URL) information of AITs so as to correspond to a time information field (e.g., media time field or start time field), through the initial AIT 610, obtains an AIT corresponding to a current media time or a start time of the content through a corresponding AIT URL field when a receiver receives the URL information, and drives an application based on the obtained AIT. Thus, the AIT 1 620, the AIT 2 630, and the AIT 3 640 which have to be applied to corresponding media times, may be driven without delay.

Figure 7:
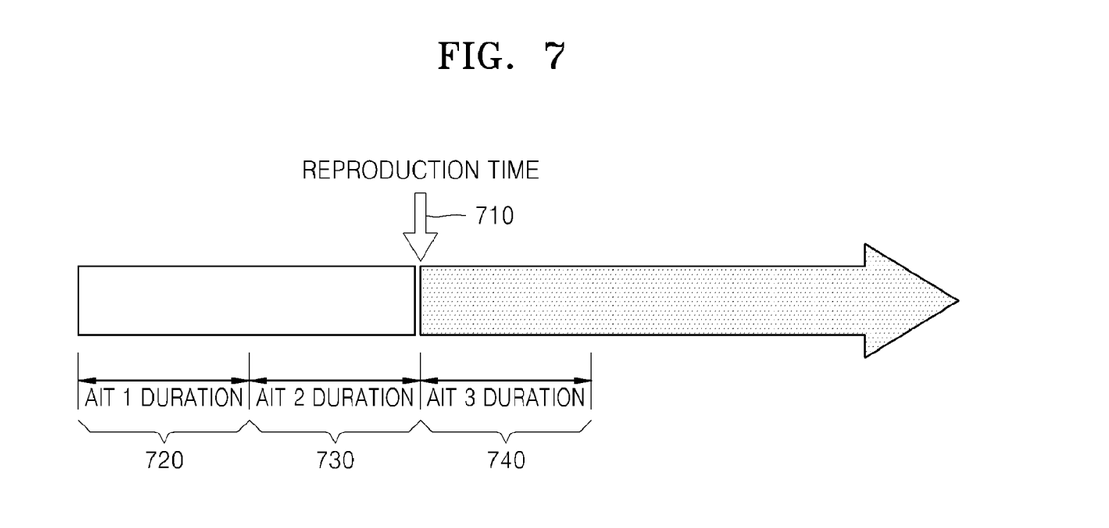
FIG. 7 is a diagram showing durations of applications based on a content reproduction time, according to an exemplary embodiment of the present invention.

As shown in FIG. 7, when content is reproduced, a valid AIT varies as time passes. In more detail, a life cycle, in which start, end, and switching times of AITs sequentially recur, exists. In this case, if the reproduction time 710 of the content is as indicated in FIG. 7, the reproduction time 710 indicates a point of time when duration 740 of the AIT 3 640 starts and thus the device requires the AIT 3 640.

Accordingly, the current reproduction time of the content is calculated in operation 530 and a media time 3 indicated in FIG. 6 is selected as the media time corresponding to the current reproduction time in operation 540. Then, the AIT 3 640 that is currently required may be obtained by using the location information of the AIT 3 640 corresponding to the media time 3, in operation 550.

Such an AIT may also be created as metadata in the form of markup language, or as a descriptor in the form of text or binary data.

The AIT may be provided in the form of MXL that is a representative markup language, as shown below.

```
<xs:element name="media_time">
    <xs:attribute value=0 duration=1800 >
        <xs:location="http://this_server/001/ait.xls" />
    </xs:atribute>
    <xs:attribute value=1800 duration=900>
        <xs:location="http://this_server/002/ait.xls" />
    </xs:attribute>
    <xs:attribute value=2700 duration=900>
        <xs:location="http://this_server/003/ait.xls" />
    </xs:attribute>
</xs:element>
```

Based on the AIT provided in the form of XML, if a media time period has a duration from a value 0 to a value 1800, a location of a corresponding AIT is "http://this_server/001/ait.xls". Likewise, if a media time has a duration from a value 1800 to a value 2700, a location of a corresponding AIT is "http://this_server/002/ait.xls", and, if a media time has a duration from a value 2700 to a value 3600, a location of a corresponding AIT is "http://this_server/003/ait.xls".

Such an AIT may diverge based on attributes and may be created as a hierarchical AIT in which location information of AITs based on reproduction times is provided at a sub level. An example of the hierarchical AIT will now be described with reference to FIG. 8.

Figure 8:
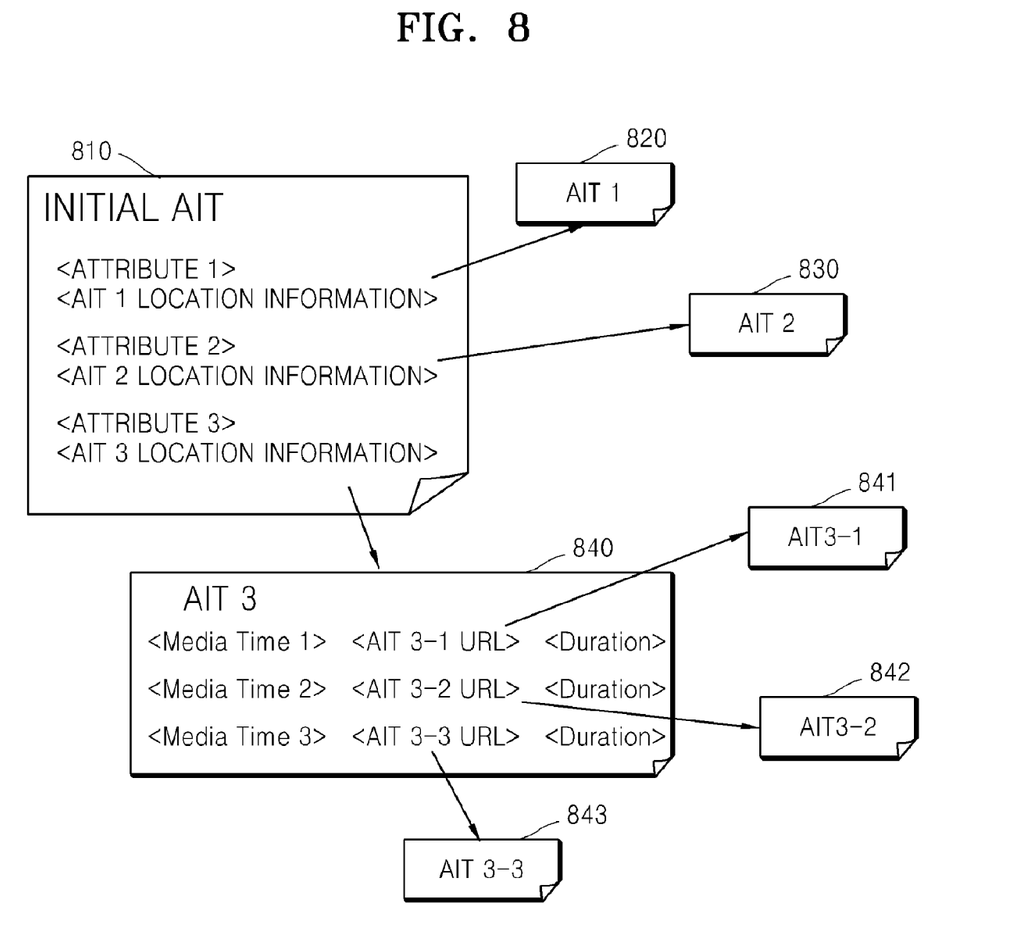
FIG. 8 is a structural diagram of a hierarchical AIT using device attribute information and content reproduction time information, according to an exemplary embodiment of the present invention.

FIG. 8 is a structural diagram of a hierarchical AIT using device attribute information and content reproduction time information, according to an exemplary embodiment of the present invention.

Referring to FIG. 8, an initial AIT 810 includes an attribute field for indicating device attribute information, and pieces of location information of an AIT 1 820, an AIT 2 830, and an AIT 3 840 corresponding to the device attribute information, respectively indicate the AIT 1 820, the AIT 2 830, and the AIT 3 840.

Meanwhile, each of the AIT 1 820, the AIT 2 830, and the AIT 3 840 may include a content reproduction time field. In more detail, as a representative example, the AIT 3 840 may include media times such as a reproduction time 3-1, a reproduction time 3-2, and a reproduction time 3-3 and thus may correspondingly include location information of an AIT 3-1 841, an AIT 3-2 842, and an AIT 3-3 843. Accordingly, the AIT 3-1 841 and the AIT 3-2 842 may be substantially obtained based on the location information of the AIT 3-1 841, the AIT 3-2 842, and the AIT 3-3 843.

As such, the hierarchical AIT may be created by including the device attribute information in an initial AIT and including the content reproduction time information in a second-level AIT. On the other hand, the hierarchical AIT may also be created by including the content reproduction time information in the initial AIT and including the device attribute information in the second-level AIT. Since conditions such as the device attribute information and the content reproduction time information may be combined, a device may effectively find an AIT exactly corresponding to its attributes and a current content reproduction time and drive an application indicated by the AIT.

Figure 9:
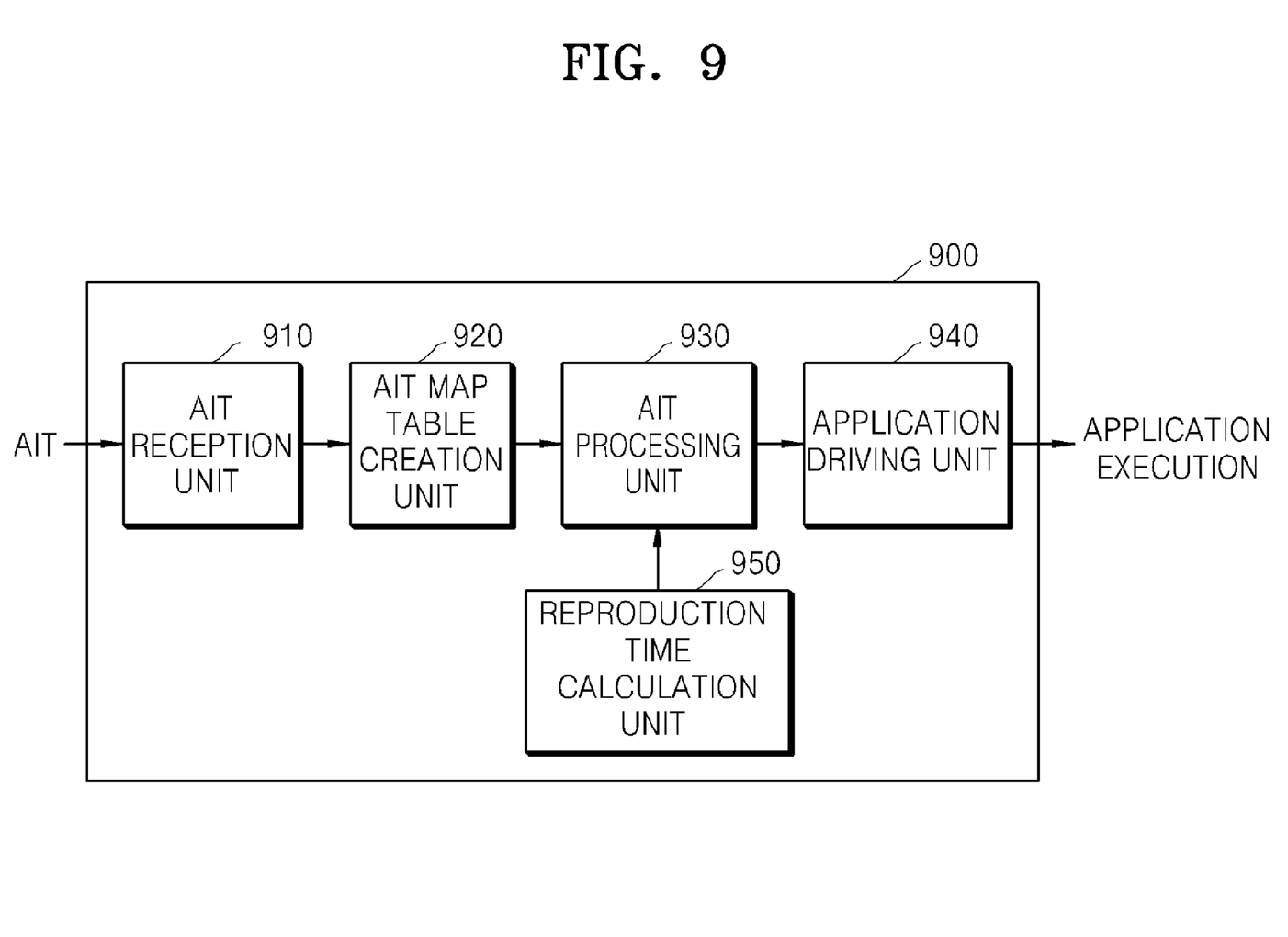
FIG. 9 is a functional block diagram of an apparatus for providing an application, according to an exemplary embodiment of the present invention.

FIG. 9 is a functional block diagram of an apparatus 900 for providing an application, according to an exemplary embodiment of the present invention.

Referring to FIG. 9, the apparatus 900 according to the current exemplary embodiment of the present invention includes an AIT reception unit 910 for receiving a first-level AIT including one or more application driving conditions and location information of one or more AITs; an AIT map table creation unit 920 for creating an AIT map table by using the first-level AIT; an AIT processing unit 930 for obtaining a second-level AIT corresponding to a desired application driving condition included in the AIT map table based on the location information of the second-level AIT; and an application driving unit 940 for driving an application based on the second-level AIT.

In addition, if the application driving conditions are related to content reproduction time information, the apparatus 900 may further include a reproduction time calculation unit 950 for calculating a current content reproduction time of content that is being reproduced by a device, with respect to a content reproduction time.

As described above, according to the exemplary embodiments of the present invention, an AIT that is the most appropriate for a receiver may be obtained by accessing a hierarchical AIT a minimum number of times, thereby providing an optimal application.

Meanwhile, exemplary embodiments of the present invention can be written as computer programs and can be implemented in general-use digital computers that execute the programs using a computer readable recording medium.

Also, the data structure used in the embodiments of the present invention described above can be recorded on a computer readable recording medium via various means.

Examples of the computer readable recording medium include magnetic storage media (e.g., ROM, floppy disks, hard disks, etc.), and optical recording media (e.g., CD-ROMs, or DVDs).

While the present invention has been particularly shown and described with reference to exemplary embodiments thereof, it will be understood by one of ordinary skill in the art that various changes in form and details may be made therein without departing from the spirit and scope of the invention as defined by the following claims. The exemplary embodiments should be considered in a descriptive sense only and not for purposes of limitation. Therefore, the scope of the invention is defined not by the detailed description of the invention but by the following claims, and all differences within the scope will be construed as being included in the present invention.

What is claimed is:

1. A method of providing an application from a data broadcasting stream to a digital content reproduction device, the method comprising:
   receiving a first-level application information table (AIT) comprising at least one application driving condition and location information of at least a second-level AIT;
   creating an AIT map table by using the first-level AIT;
   obtaining the second-level AIT corresponding to a predetermined application driving condition in the AIT map table, based on a location information of the second-level AIT; and
   driving an application based on the second-level AIT.

2. The method of claim 1, wherein one of the at least one application driving condition comprises device attribute information, user attribute information, or content reproduction time information.

3. The method of claim 2, wherein, if the one of the at least one application driving condition comprises the device attribute information or the user attribute information, the device attribute information or the user attribute information comprises at least one main attribute information and at least one sub attribute information, and
   wherein the first-level AIT and the second-level AIT are hierarchically organized based on the at least one main attribute information in the first-level AIT and the at least one sub attribute information in the second-level AIT.

4. The method of claim 3, wherein the second-level AIT comprises location information of a third-level AIT corresponding to the at least one sub attribute information, and
   wherein the method further comprises:
   obtaining the third-level AIT based on the location information of the third-level AIT; and
   driving an application based on the third-level AIT.

5. The method of claim 2, wherein, if the one of the at least one application driving condition comprises the content reproduction time information, the method further comprises:
   calculating a current reproduction time of content that is being reproduced by a device; and
   selecting a media time corresponding to the current reproduction time from at least one content reproduction time information of the at least one application driving condition, and
   wherein the obtaining of the second-level AIT comprises obtaining the second-level AIT based on the location information of the second-level AIT corresponding to the media time.

6. The method of claim 5, wherein the first-level AIT and the second-level AIT are hierarchically organized by including the content reproduction time information in the first-level AIT and including the device attribute information or the user attribute information in the second-level AIT.

7. The method of claim 6, wherein the second-level AIT comprises location information of a fourth-level AIT corresponding to the device attribute information or the user attribute information, and
   wherein the method further comprises:
   obtaining the fourth-level AIT based on the location information of the fourth-level AIT; and
   driving an application based on the fourth-level AIT.

8. The method of claim 7, wherein the AITs are metadata in form of markup languages, or descriptors in form of text data or binary data, wherein the levels of the AITs are at least two.

9. The method of claim 8, wherein the device attribute information comprises information regarding a vendor or hardware (H/W) of a device,
   wherein the user attribute information comprises information regarding a preference or an age of a user of the device, and
   wherein the content reproduction time information comprises information regarding a media time or a start time of content.

10. The method of claim 2, wherein the obtaining of the second-level AIT comprises obtaining the second-level AIT corresponding to a desired application driving condition described by using an AND operator, OR operator, or NOT operator from among the at least one application driving condition included in the first-level AIT.

11. An apparatus for providing an application from a data broadcasting stream to a digital content reproduction device, the apparatus comprising:
    an application information table (AIT) reception unit which receives a first-level AIT comprising at least one application driving condition and location information of at least a second-level AIT;
    an AIT map table creation unit which creates an AIT map table by using the first-level AIT;
    an AIT processing unit which obtains the second-level AIT corresponding to a predetermined application driving condition in the AIT map table, based on a location information of the second-level AIT; and
    an application driving unit which drives an application based on the second-level AIT.

12. The apparatus of claim 11, wherein the one of the at least one application driving condition comprises device attribute information, user attribute information, or content reproduction time information.

13. The apparatus of claim 12, wherein, if the one of the at least one application driving condition comprises the device attribute information or the user attribute information, the device attribute information or the user attribute information comprises at least one main attribute information and at least one sub attribute information, and
    wherein the first-level AIT and the second-level AIT are hierarchically organized based on the at least one main attribute information in the first-level AIT and the at least one sub attribute information in the second-level AIT.

14. The apparatus of claim 13, wherein the second-level AIT comprises location information of a third-level AIT corresponding to the at least one sub attribute information,
    wherein the AIT processing unit obtains the third-level AIT based on the location information of the third-level AIT, and
    wherein the application driving unit drives an application based on the third-level AIT.

15. The apparatus of claim 12, wherein, if the one of the at least one application driving condition comprises the content reproduction time information, the apparatus further comprises a reproduction time calculation unit which calculates a current reproduction time of content that is being reproduced by a device, and
    wherein the AIT processing unit selects a media time corresponding to the current reproduction time from at least one content reproduction time information of the at least one application driving condition, and obtains the second-level AIT based on the location information of the second-level AIT corresponding to the media time.

16. The apparatus of claim 15, wherein the first-level AIT and the second-level AIT are hierarchically organized by including the content reproduction time information in the first-level AIT and including the device attribute information or the user attribute information in the second-level AIT.

17. The apparatus of claim 16, wherein the second-level AIT comprises location information of a fourth-level AIT corresponding to the device attribute information or the user attribute information, wherein the AIT processing unit obtains the fourth-level AIT based on location information of the fourth-level AIT, and wherein the application driving unit drives an application based on the fourth-level AIT.

18. The apparatus of claim 17, wherein the AITs are metadata in form of markup languages, or as descriptors in form of text data or binary data, wherein the levels of the AITs are at least two.

19. The apparatus of claim 18, wherein the device attribute information comprises information regarding a vendor or hardware (H/W) of a device, wherein the user attribute information comprises information regarding a preference or an age of a user of the device, and wherein the content reproduction time information comprises information regarding a media time or a start time of content.

20. A computer readable recording medium having recorded thereon a computer program for executing the method of providing an application from a data broadcasting stream to a digital content reproduction device, the method comprising:

receiving a first-level application information table (AIT) comprising at least one application driving condition and location information of at least a second-level AIT;

creating an AIT map table by using the first-level AIT;

obtaining the second-level AIT corresponding to a predetermined application driving condition in the AIT map table, based on a location information of the second-level AIT; and driving an application based on the second-level AIT.

* * * * *